United States Patent Office 3,542,869
Patented Nov. 24, 1970

3,542,869
1-AMINO-1-(o-CHLOROPHENYL)-2-BUTANONE
AND THE ACID SALTS THEREOF
Takayuki Naito, Susumu Nakagawa, and Yukio Narita, Tokyo, Japan, assignors, by mesne assignments, to Bristol-Myers Company, a corporation of Delaware
No Drawing. Filed Oct. 25, 1967, Ser. No. 677,849
Int. Cl. C07c 91/28
U.S. Cl. 260—570.5      2 Claims

ABSTRACT OF THE DISCLOSURE

The compound 1-amino-1-(o-chlorophenyl)-2-butanone and the acid salts thereof. The product, 1-amino-1-(o-chlorophenyl)-2-butanone can be produced by reacting o-chlorophenylglycine with propionic acid anhydride to produce an intermediate which is acidified to the product. Alternatively, o-chloro-phenylglycine is reacted with either an organic acid anhydride or halide. The reaction product therefrom is reacted with propionic acid anhydride and subsequently acidified. The product has hypocholesterolemic activity and is also useful as an intermediate in the preparation of certain 4-hydroxyisothiazoles having antifungal activity.

---

This invention relates to novel ketones and methods for preparing the same. More particularly, the present invention relates to the compound 1-amino-1-(o-chlorophenyl)-2-butanone, the acid salts thereof and methods for preparing the same.

The compound 1-amino-1-(o-chlorophenyl)-2-butanone can be conveniently prepared by the series of reactions shown by the following equations:

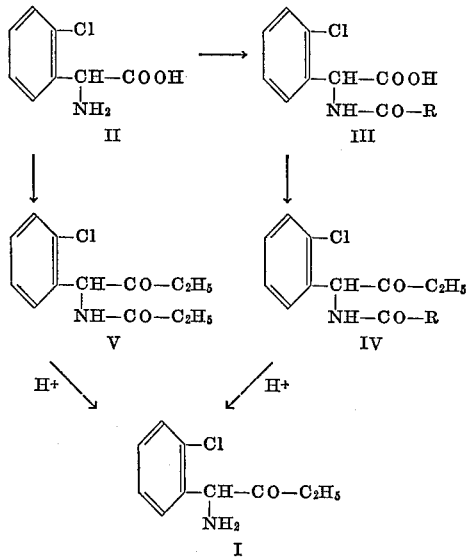

wherein R is alkyl, aralkyl or aryl.

As shown in the above equation, the compound of Formula I, 1-amino-1-(o-chlorophenyl)-2-butanone, can be prepared by either of two alternative methods. The starting material, o-chlorophenylglycine represented by Formula II can be prepared by any convenient method such as that shown by Harvil et al., J. Org. Chem., 9, 21 (1944).

The compound of Formula III, N-acyl-alpha-(o-chlorophenyl)glycine, is prepared by reacting the compound of Formula II with either an organic acid anhydride or halide (e.g., chloride). The reaction is carried out in the presence of a basic catalyst such as sodium hydroxide or potassium hydroxide. The acid anhydride or halide is employed in amounts of between about 1 and about 3 moles per mole of o-chlorophenylglycine. When employing reactants within the above ratios, the compound of Formula III is produced while minimizing undesirable side reactions involving the carboxyl moiety of o-chlorophenylglycine. The reaction can be carried out at a temperature of between about 10° C. and about 100° C. Upon completion of the reaction, the reaction mixture is filtered and the filtrate is acidified to precipitate the compound of Formula III. Additional product can be obtained by re-treating the filtrate from the acidification step. The product can be purified in any normal manner as for example by recrystallization.

The compound of Formula IV is obtained by reacting the compound of Formula III with propionic acid anhydride. The amount of propionic acid anhydride employed is between about 3 and about 6 moles per mole of the compound of Formula III. The reaction is carried out by refluxing the reaction mixture for a period of time sufficient to substantially complete reaction. The reaction is desirably carried out in the presence of an organic solvent which is essentially non-reactive with either of the reactants. Suitable solvents include pyridine and dimethylformamide. Upon completion of the reaction, the reaction mixture is filtered. Solvent and unreacted materials are evaporated from the filtrate giving a residue containing the product. The product can be purified in any manner well known in the art as for example by recrystallization.

The compound of Formula I is prepared by hydrolyzing the compound of Formula IV with an acid. The reaction can be carried out either in the absence of or in the presence of an organic solvent. Suitable solvents which can be employed are lower alkanols such as ethanol and propanol. The reaction mixture is heated to reflux temperature and reflux for a period of time sufficient to substantially complete the reaction. Upon completion of the reaction, the reaction mixture can be treated with an adsorbent such as activated carbon or silica to improve the color thereof. The reaction mixture is then filtered and the residue is recovered. Any strong acid, especially strong mineral acids such as hydrochloric acid, hydrobromic acid, sulfuric acid and the like can be employed in the hydrolysis reaction. The product therefrom is the acid addition salt of the compound of Formula I which can be recovered. The compounds of Formula I can be obtained from the acid addition salts by mixing the salt with a base and precipitating the free Formula I compound.

An alternative method for obtaining the compound of Formula I is by reacting the compound of Formula II with propionic acid anhydride in a first step to obtain the compound of Formula V. The reaction is effected in the presence of an organic solvent with the propionic acid anhydride being present in amounts of between about 3 and 6 moles per mole of the compound of Formula II. The reaction mixture is heated to reflux temperature and is refluxed for a period of time sufficient to substantially completely effect reaction. Upon completion of the reaction, the reaction mixture is filtered and the filtrate is heated under vacuum to leave a residue which is recovered. The residue can then be purified in any manner well known in the art as for example by recrystallization.

The compound of Formula V is then hydrolyzed with an acid to produce the compound of Formula I. The reaction can be carried out either in the presence of or in the absence of an organic solvent. Suitable organic solvents which can be employed include lower alkanol such as ethanol and propanol. The reaction is heated to reflux temperature and refluxed for a period of time sufficient to substantially complete the reaction. Upon completion of the reaction, the reaction mixture is heated to remove solvent and unreacted materials. The compound of Formula I is then recovered from the residue and can be purified by recrystallization in a manner well known in the art.

The compound 1 - amino-1-(o-chlorophenyl)-2-butanone and the salts thereof have hypocholesterolemic activity.

The compound of Formula I is also useful in producing 4-hydroxyisothiazoles which have antifungal activity. The 4-hydroxyisothiazoles produced from 1-amino-1-(o-chlorophenyl)-2-butanone are 4-hydroxy-5-methyl-3-(o-chlorophenyl)-isothiazole represented by Formula VI and 4-hydroxy-5-formyl - 3-(o-chlorophenyl)-isothazole represented by Formula VII.

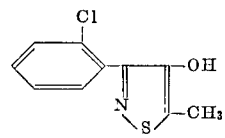

VI

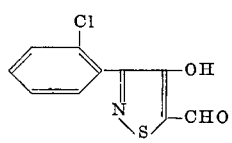

VII

The compound of Formula VI is produced by reacting the compound of Formula I with either thionyl chloride at a temperature of between about 5° C. and about 50° C. or with sulfur monochloride at a temperature between about 5° C. and about 15° C. Thionyl chloride is employed in amounts of between about 2 and about 5 moles per mole of the compound of Formula I. Sulfur monochloride is employed in amounts of between about 3 and about 6 moles per mole of the compound of Formula I. The reaction is carried out in the presence of an organic solvent which does not react with either of the reactants. Suitable solvents which can be employed when effecting reaction with sulfur monochloride are dimethylformamide, tetrahydrofuran, benzene, toluene, nitromethane and cyanomethane. When reacting with thionyl chloride, it is desirable that the solvent be a polar solvent in order to effect reaction.

The compound of Formula VII is prepared by reacting the compound of Formula I with sulfur monochloride at a temperature between about 70° C. and about 95° C. Sulfur monochloride is employed in amounts of between about 3 and about 6 moles per mole of the compound Formula I.

The 4-hydroxyisothiazoles are recovered from the reaction mixture by filtration and can be purified in any manner well-known in the art. The 4-hydroxyisothiazoles are soluble in dilute basic aqueous solutions such as dilute sodium hydroxide but are insoluble in neutral or acid water. The 4-hydroxyisothiazoles as well as their O-acetyl and O-methyl derivative have an antifungal activity against *T. mentagrophytes, T. rubrum* and *M. canis.*

As stated above, 1-amino-1-(o-chlorophenyl)-2-butanone and the acid addition salts thereof have hypocholesterolemic activity. In use, the effectiveness of the compound will depend upon various factors including age, sex, weight and physical condition. Usually, in practice, the compound is given preliminarily in small dosages, and then in increasingly larger doses until satisfactory effectiveness is obtained without significant side effects. Normally, the dosage employed will be in the range of from about 1 to about 1,000 milligrams and at a frequence of 1 to 6 times per day.

These variables can be adjusted to the need of the patient by the use of gradually increasing dosages. In this instance the determination of the dosage is usually based in part on the determination of the cholesterol blood level. The compounds of this invention can be mixed with any physiologically acceptable carrier, in the above dosages, for use in reducing the cholesterol level in animals.

The following examples are intended to illustrate the present invention and are not intended to limit the same.

EXAMPLE 1

Preparation of 1-(o-chlorophenyl)-1-propionamido-2-butanone

A mixture of 18.6 g. (0.1 mole) of o-chlorophenylglycine, 63 ml. (0.5 mole) of propionic acid anhydride and 42 ml. of pyridine was heated for 5 hours on a water bath and then refluxed for 0.5 hour on an oil bath. The color of the solution changed from pale yellow to red. The reaction mixture was filtered to remove insoluble inorganic salt, the filtrate being evaporated under reduced pressure. The residue was dissolved in ether and the solution filtered to remove a small amount of insoluble material. The ether was evaporated and the residue was distilled to give 10.7 g. (38.6%) of 1-(o-chlorophenyl)-1 - propionamido - 2 - butanone boiling at 143–149° C./1 mm.

EXAMPLE 2

1-amino-1-(o-chlorophenyl)-2-butanone

A solution of 10 g. (0.04 mole) of 1-(o-chlorophenyl)-1-propionamido-2-butanone in 50 ml. of ethanol was treated with 170 ml. of 6 N hydrochloric acid and the mixture refluxed for 3.5 hours. The reaction mixture was evaporated into dryness under reduced pressure. Acetone was added to the residue and the resulting colorless crystals collected. The residue was triturated with acetone to give 7 g. (85%) of 1-amino-1-(o-chlorophenyl)-2-butanone hydrochloride as colorless crystals. Recrystallization from dilute hydrochloric acid gave colorless needles melting at 176° C. (in a sealed tube). The compound 1-amino-1-(o-chlorophenyl)-2-butanone is obtained from the hydrochloride salt by mixing the salt with a suitable base, such as sodium hydroxide in aqueous soluition and recovering the compound by precipitation.

EXAMPLE 3

Preparation of 1-amino-1-(o-chlorophenyl)-2-butanone hydrochloride

A suspension of 251.5 g. (1.38 moles) of o-chlorophenylglycine in 525 ml. of pyridine was mixed with 800 ml. of propionic anhydride and the mixture was heated for 3 hours at 100° C., then refluxed for one hour. The next day the reaction mixture was again refluxed for one hour, cooled to room temperature and filtered. The filtrate was evaporated under reduced pressure on a water bath to give the crude α-acylamido ketone which was then refluxed for 2 hours with 800 ml. of 6 N hydrochloric acid. The mixture was treated with active carbon and filtered. The filtrate was evaporated into dryness under reduced pressure and the residue triturated with acetone to give 148 g. of the α-amino ketone. Additional amount (8 g.) of the product was obtained from the acetone solution. The crude product was combined and recrystallized from 10% hydrochloric acid to give 104 g. (overall 32%) of pure 1-amino-1-(o-chlorophenyl)-2-butanone hydrochloride.

EXAMPLE 4

Preparation of α-acetamido-o-chlorophenylacetic acid

To a stirred mixture of 18 g. (0.1 mole) of o-chlorophenylglycine and 4.5 g. (0.11 mole) of sodium hydroxide in 70 ml. of water was added dropwise 19 g. (0.19 mole) of acetic anhydride at 10° C. and the mixture was stirred for additional two hours at room temperature. The reaction mixture was filtered and the filtrate was acidified to pH 2.0 with 20% hydrochloric acid. The resulting precipitate (14 g.) was collected by filtration. The second crop (3 g.) was obtained from the filtrate by extraction with ether (30 ml., 10 ml.) followed by evaporation of the solvent. The total yield of α-acetamido-o-chlorophenylacetic acid was 17 g. (78%). Recrystallization from benzene gave colorless needles melting at 164–165° C.

EXAMPLE 5

Preparation of 1-acetamido-1-(o-chlorophenyl)-2-butanone

A mixture of 14 g. (0.065 mole) of α-acetamido-o-chlorophenylacetic acid, 34 g. (0.26 mole) of propionic anhydride and 40 ml. of dry pyridine was heated under reflux for 3 hours. The reaction mixture was filtered and the filtrate evaporated under reduced pressure. The residual oil was distilled to give 4.0 g. (27%) of 1-acetamido-1-(o-chlorophenyl)-2-butanone boiling at 145–146° C./0.8 mm.

EXAMPLE 6

Preparation of 1-amino-1-(o-chlorophenyl)-2-butanone

A solution of 4.0 g. (0.017 mole) of 1-acetamido-1-(o-chlorophenyl)-2-butanone in 20 ml. of ethanol was treated with 70 ml. of 6 N hydrochloric acid and the mixture was refluxed for 3 hours. The reaction mixture was treated with active carbon and filtered. The filtrate was evaporated into dryness under reduced pressure to leave a violet-colored solid, which was dissolved in 50 ml. of hot 10% hydrochloric acid, and decolored with active carbon. The solution was concentrated under reduced pressure to separate 3.7 g. (93%) of 1-amino-1-(o-chlorophenyl)-2-butanone hydrochloride. The compound 1-amino-1-(o-chlorophenyl)-2-butanone is obtained from the hydrochloride salt by mixing the salt with a suitable base such as sodium hydroxide in aqueous solution and recovering the compound by precipitation and filtration.

EXAMPLE 7

This example illustrates the unexpected hypocholesterolemic activity of 1-amino-1-(o-chlorophenyl)-2-butanone.

A group of 3 male rats was given orally 100 mg./kg. of test compound once daily for 4 days. Six rats, serving as controls, were dosed similarly with the same volume of vehicle without the test compound. The animals were sacrificed on the fifth day and the serum cholesterol was determined by a Technicon Autoanalyzer. The cholesterol levels of 3 rats of a test group were averaged and compared to the value obtained with the control group to calculate the percentage decrease from controls. A decrease of 20% or more is considered to be significant.

The following 19 analogous compounds of 6-amino-1-(o-chlorophenyl)-2-butanone were synthesized and evaluated for hypocholesterolemic activity at 100 mg./kg./day. 6-amino-1-(o-chlorophenyl)-2-butanone was comparatively tested as a reference compound which was given 100 mg./kg./day. The compounds tested are represented by the following general formula:

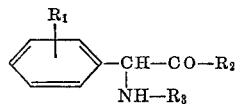

The results obtained with these analogous compounds are shown in the following table.

| Compound | | | Hypocholesterolemic activity (percent decrease) |
|---|---|---|---|
| $R_1$ | $R_2$ | $R_3$ | |
| o-Cl | $NH_2$ | H | 0 |
| H | $C_2H_5$ | H | 6 |
| H | $CH_3$ | H | 4 |
| p-Cl | $C_2H_5$ | H | 0 |
| 2,4-di-Cl | $C_2H_5$ | H | 0 |
| 2,4-di-Cl | $CH_3$ | H | 0 |
| o-Cl | $CH_3$ | H | 3 |
| p-Cl | $CH_3$ | H | 0 |
| o-Cl | $C_3H_7$ | H | 2 |
| o-OCH$_3$ | $HC_3$ | H | 0 |
| o-OCH$_3$ | $C_2H_5$ | H | 0 |
| p-OCH$_3$ | $CH_3$ | H | 0 |
| p-OCH$_3$ | $C_2H_5$ | H | 6 |
| p-CH$_3$ | $CH_3$ | H | 4 |
| o-Cl | $CH_2$—$C_6H_5$ | H | 0 |
| o-CH$_3$ | $C_2H_5$ | H | 12 |
| o-CH$_3$ | $CH_3$ | H | 8 |
| o-Cl | OH | $COCH_3$ | 0 |
| o-Cl | $OC_2H_5$ | H | 0 |
| p-CH$_3$ | $C_2H_5$ | H | 0 |
| o-Cl | $C_2H_5$ | H | 23 |
| o-Cl | $C_2H_5$ | H | 24 |
| o-Cl | $C_2H_5$ | H | 42 |
| o-Cl | $C_2H_5$ | H | 39 |
| o-Cl | $C_2H_5$ | H | 24 |

We claim:
1. A compound selected from the group consisting of 1-amino-1-(o-chlorophenyl)-2-butanone and the acid addition salts thereof.
2. The compound of claim 1 which is 1-amino-1-(o-chlorophenyl)-2-butanone.

References Cited

UNITED STATES PATENTS 3,032,581  5/1962  Leonard _____ 260—471
3,254,124  5/1966  Stevens _____ 260—570.5

OTHER REFERENCES

Glosh et al.: "Chemical Abstracts," vol. 50, pp. 11,314–15 (1956).

Glosh et al.: "Chemical Abstracts," vol. 50, p. 11,344 (1956).

King et al.: "Jour. Amer. Chem. Soc.," vol. 77, pp. 2814–16 (1955).

ROBERT V. HINES, Primary Examiner

U.S. Cl. X.R.

260—302, 518, 558, 562; 424—270, 330